United States Patent

[11] 3,593,364

| [72] | Inventor | Philip J. Liautaud |
| | | Hoffman Estates, Ill. |
| [21] | Appl. No. | 829,866 |
| [22] | Filed | June 3, 1969 |
| [45] | Patented | July 20, 1971 |
| [73] | Assignee | Fendall Company |
| | | Chicago, Ill. |

[54] SPECTACLE HINGE PIN
4 Claims, 6 Drawing Figs.

[52] U.S. Cl. .................................................. 16/168, 351/140
[51] Int. Cl. ...................................................... E05d 5/10
[50] Field of Search .......................................... 16/128 A, 168, 169, 128; 351/140, 101, 153

[56] References Cited
UNITED STATES PATENTS

| 2,987,332 | 6/1961 | Bonmartini ................ | 16/168 |
| 1,974,160 | 9/1934 | Peirson ....................... | 16/168 |
| 3,349,430 | 10/1967 | Rosenvold et al. ............ | 16/169 |

*Primary Examiner*—Bobby R. Gay
*Assistant Examiner*—Doris L. Troutman
*Attorney*—Hill, Sherman, Meroni, Gross & Simpson

ABSTRACT: A hinge pin constructed of solid molded plastic for assembly with conventional spectacle temple-to-frame hinges. A plastic hinge pin is provided having a peripheral interference fit with respect to the hinge plate pivot apertures and integral yieldable means to retain it in position therein. One form of the invention provides a pin having a varying peripheral diameter with a maximum diameter in excess of and in interference fit with the inner surface of the hinge barrel.

PATENTED JUL 20 1971
3,593,364
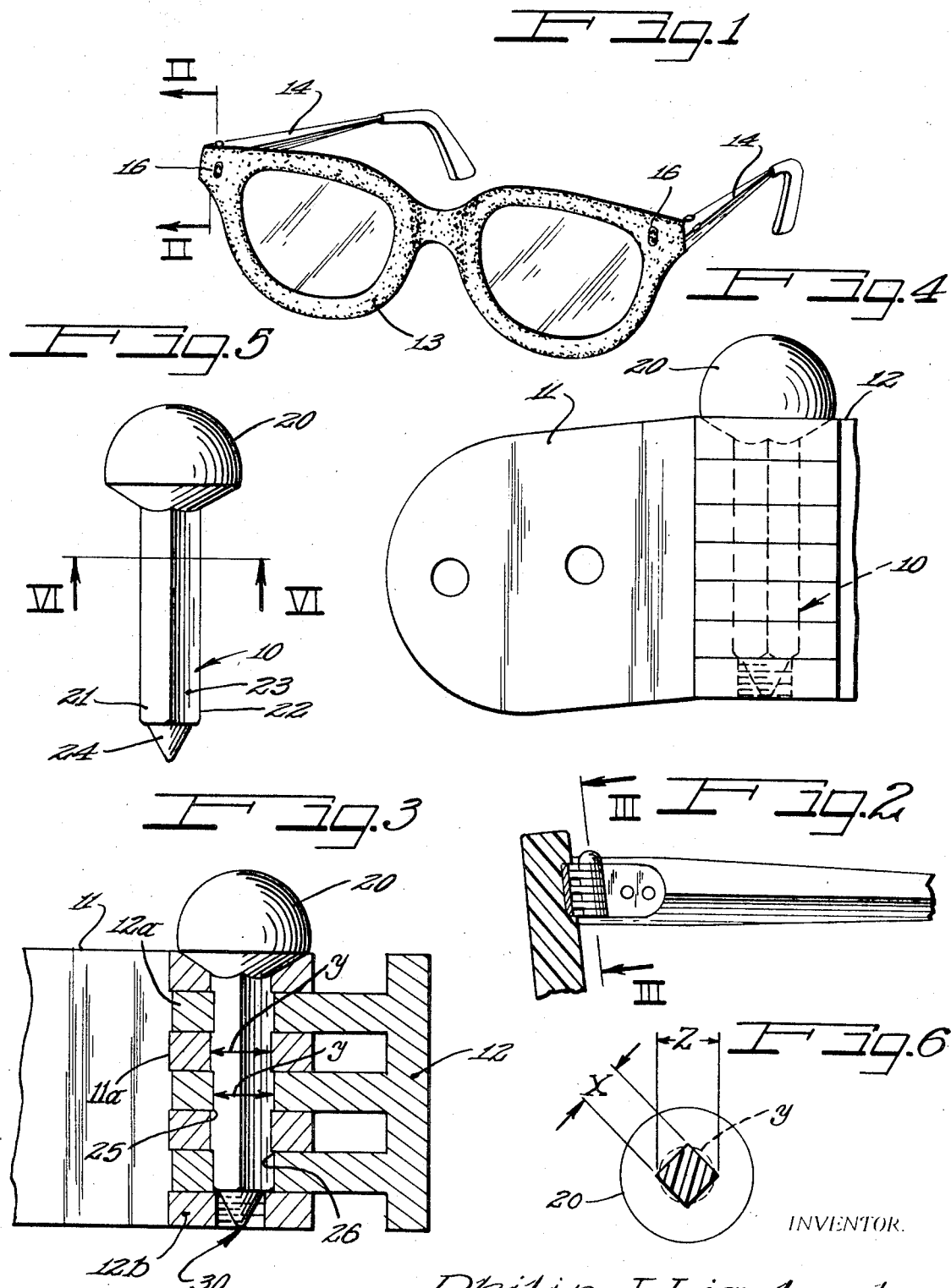
INVENTOR.
Philip J. Liautaud
BY Hill, Sherman, Meroni, Gross, Simpson
ATTORNEYS 3,593,364

SPECTACLE HINGE PIN

BACKGROUND OF THE INVENTION

Spectacle or eyeglass frames having traditionally been manufactured with a main frame portion containing lenses and two attached, pivotally mounted, temples. In conventional practice the temples are pivotally secured to the main frame by way of hinges. The hinge base plates are respectively secured to the main frame and temple and a generally vertically disposed hinge pin is secured in aligned pivot apertures in the hinge barrel. A chronic problem in the art has resulted from the fact that conventional hinge pins have been threaded and that due to the oscillating of the temple relative to the frame, the pins have a tendency to loosen and become lost. The present invention, which comprises an improvement over my prior patent application entitled "Spectacle Hinge Pin"; Ser. No. 622,568, filed Mar. 13, 1967, provides a simplified hinge pin incorporating integral means to prevent accidental disassembly and loss of the hinge pin from the spectacle combination.

To applicant's knowledge, the prior art in the field of accidental loss-prevention hinge pins relates to means for riveting or peening over the hinge pin or screw providing a split spring metal hinge pin mechanically collapsible to permit assembly, or providing a split spring metal hinge barrel cooperable with a large detent means on the pin. Examples of prior patented art include U.S. Pat. Nos. 2,947,024 to Czudak and 3,110,057 to Urich. The prior art does not, however, include any spectacle hinge pin inherently deformable under the application of high stress and wherein the deformation occurs in a solid pin configuration. Accordingly, to applicant's knowledge, no prior pin configuration has been employed wherein no machining steps are applied to the pin in its manufacture. In prior art systems accidental loss prevention of hinge pins has constituted a hinge pin configuration in which the pin or screw is riveted or otherwise peened over is mechanically collapsible in the form of a split spring metal hinge pin. Although considerable study has been given the problem of hinge pin retention, no prior art patent has, prior to applicant's, conceived of a spectacle hinge pin which provides no observable retention means, no retention shoulder, detent, or the like, and performs to provide actual retention in use.

SUMMARY OF THE INVENTION

Molded plastic materials such as self-lubricating Nylon, a high molecular weight polyamide, manufactured by E.I. du Pont de Nemours & Co., Teflon, a polytetrafluoroethylene, manufactured by E.I. du Pont de Nemours & Co., and the like, are extremely tough and are semiresilient. They may, in their molded form, be deflected and, more particularly, deformed under pressure, and at the same time, will return to their original molded configuration after removal of the deformation pressure. When constructed in the form of a pin, such plastic materials have successfully provided pivots capable of sustained operation. However, I have discovered that in some heavy-duty industrial applications, the plastic hinge pin configurations heretofore contemplated have proven to be incapable of disassembly. For example, in my earlier application, Ser. No. 622,568, filed Mar. 13, 1967, I have described a plastic hinge pin providing a substantially uniform pin diameter combined with an enlarged retaining or detent configuration. Such a pin has proven satisfactory in carrying hinge pivot loads in substantially any spectacle use. However, in safety glass application wherein such pins have commonly been employed, I have found that continual manipulation of the temple relative to the eyeglass frame has caused cold flow or permanent deformation of the plastic pin in a localized sense. While this deformation has in no way caused failure of the pin, it has, on occasion, been of sufficient degree to prevent removal of the pin from the spectacle frame. I have found that in such instances, the provision of a somewhat enlarged detent end portion of the pin, as shown in my earlier patent application, Ser. No. 622,568, has provided sufficient retentivity that, in combination with the cold flow deformation along the main stem of the pin, the retentivity level has reached a point at which the pin cannot be effectively removed by axially applied pressures.

In accordance with the principles of the present invention, I have provided a plastic hinge pin in which no enlarged detent or shoulder portion is provided. The pin is provided with no apparent means of retention in the series of aligned hinge leaves. Thus, for example, when the pin is initially inserted into the hinge barrel, it may momentarily be pushed into the hinge barrel with minimal effort. Intentionally, the only retaining force maintaining the hinge pin is assembled relation with the hinge leaves is a frictional deformation of the pin. No initial shoulder or other retention mechanism is employed. However, upon manipulation of the temple relative to the spectacle frame for a few oscillations, the pin cold-flows or forms slightly sufficient to maintain the pin locked in position. In my preferred embodiment, the pin is provided with spaced, longitudinally extending, continuous ribs of a dimension slightly greater than the diameter of the hinge apertures separated by grooves of a root diameter less than the diameter of the hinge apertures. In this preferred embodiment, the cross-sectional area of the pin is the same as, or slightly less than, the area of the hinge apertures. By this technique, the pin may be deformed and inserted readily. I have found, however, that once inserted the pin is laterally deflected and removal becomes difficult and unlikely in the absence of tools.

The pin of the present invention is similar to that illustrated in my copending application Ser. No. 622,568 dated Mar. 13, 1967, except that no enlarged detent portion is provided for cooperation with the normally threaded, reduced-diameter aperture of the lowermost hinge leaf. Elimination of this detent portion has not, however, caused an arrangement in which simple separation of the hinge parts is permitted. The above-mentioned cold flow of the pin upon repeated deflections of the temple and spectacle frame provides a deformed pin which positively remains in the hinge until forced therefrom by a tool. Whereas, in some instances of heavy-duty operation, the hinge pin of my prior invention has proved extremely difficult to remove, the hinge pin of the present invention is removable with moderate pressure under substantially any circumstances, but will not work loose of its own accord.

It is, accordingly, an object of the present invention to provide an improved spectacle hinge pin having substantially universal utility as a replacement or original equipment hinge pin for spectacles or the like.

BRIEF DESCRIPTION OF THE DRAWINGS

As shown on the drawings, FIG. 1 is an isometric view of a spectacle assembly;

FIG. 2 is a cross-sectional view taken along the line II—II of FIG. 1;

FIG. 3 is an enlarged cross-sectional view taken along the line III—III of FIG. 2;

FIG. 4 is an elevational view of the hinge assembly with the pin inserted therein;

FIG. 5 is a detail view of the pin of the present invention per se; and

FIG. 6 is a cross-sectional view taken along the line VI-VI of FIG. 5.

DESCRIPTION OF THE PREFERRED EMBODIMENT

As can be seen from a consideration of FIGS. 1 through 5, my preferred embodiment of the invention comprises a hinge pin generally indicated at 10 securing hinge plates 11 and 12 attached respectively to the main spectacle frame 13 and spectacle temples 14. The hinge plates 11 and 12 are conventional and may be secured in any conventional manner to the frame. In the embodiment shown, rivets 15 and rivet plate 16 are employed for this purpose.

The hinge pin 10 comprises an enlarged head portion 20 and a shank portion 21 which, in the embodiment illustrated, is generally polygonal in cross section. As can be seen from FIG. 6, this polygonal cross section may take the form of a square, although as will be clear from subsequent discussion, the precise cross-sectional configuration may be varied in accordance with the present invention.

Preferably, the minimum diameter X of the cross-sectional configuration of the shank 21, as illustrated in FIG. 6, is smaller than the diameter Y of the hinge leaves 11a and 12a as shown in FIG. 3. The maximum dimension Z, on the other hand, is preferably slightly larger than the dimension Y. The result of this relationship is that the pin 20 may be forced through the aligned apertures of the leaves 11a, 12a by sufficient pressure to deform the material of the pin 20 from the maximum edges 22 toward the minimum diameter grooves or flats 23 sufficient to permit passage of the shank 21. The end 24 of the pin is provided with a shaped point to reduce the pressure necessary for insertion.

Immediately following insertion of the pin 20 into the hinge, as generally shown in FIG. 4, the pin may be withdrawn with substantially the same ease as it was inserted. However, with a few manipulations of the frame and temple, it has been found that the hinge leaves 11a and 12a move transversely relative to each other a slight amount, deforming the material of the shank into a staggered configuration as illustrated in FIG. 3. The result of this staggered configuration is that the pin 20 will not readily move out of the aligned apertures since the shoulders 25, 26 interfere with the leaf portions immediately thereabove. This controlled deformation provides, accordingly, a permanent hinge assembly capable of disassembly only upon the application of a tool in the direction of the arrow 30 shown in FIG. 3. It has been found that the pin need not be threaded or otherwise provided with a detent for cooperation with the lowermost leaf 12b.

The precise dimensions will, of course, vary with individual manufacturers of spectacles. However, as an example of a successful construction, it may be noted that a dimension $X=0.040$ inch and a dimension $Z=0.062$ inch has proven quite satisfactory for cooperation with hinge apertures of approximately 0.040. inch. Self-lubricating semirigid plastic materials of the type generally described in my earlier application may satisfactorily be used. For example, the polyolefins such as polyethylene and polypropylene, tetrafluroroethylene, as well as vinyl chloride, vinylidine chloride and the high molecular weight polyamides are satisfactory. These products provide, when molded or extruded, a surface that upon cooling assumes a molecular alignment and density providing a self-lubricating characteristic of extreme toughness and resistance to surface cracks.

As pointed out above, it will be apparent to those skilled in the art that the polygonal square-shaped cross section may be modified to a configuration of various numbers of ridges or splines separated by valleys. It is preferred, however, that in the revision of the pin cross section, the overall total cross-sectional area of the pin material remain the same as, or less than, the area of the apertures in order to simplify installation and removal of the pin. The pin may be kept cylindrical if desired, and in such case the pin area should be substantially the same as the area of the apertures. In this latter case the hinge should be flexed a number of times immediately following assembly to assure deformation of the pin and prevent inadvertent disassembly. The length of the shank 21 may be varied. In the embodiment illustrated, the pin does not project below the bottom surface of leaf 12b. This is preferred since inadvertent disassembly is less likely. Further, the plastic pin cannot deflect under an axial force applied at 30 and removability is assured. In view of such modifications, it will be clear that my intention is that the scope of the present invention be limited solely by that of the hereinafter appended claims.

I claim as my invention:

1. A hinge pin for use with a pair of metal hinge plates having interleaved rigid portions with aligned pivot apertures, said pin comprising a generally peripherally solid member of semiresilient plastic of a strength less than the strength of said hinge plates and having a cross-sectional area substantially no greater than said pivot apertures, said cross section comprising longitudinally extending ridge portions projecting radially into interference fit with the sides of said apertures, said ridge portions being spaced by longitudinally extending valley portions of a radius less than the radius of said apertures, said pin having a substantially uniform cross-sectional area throughout the length thereof contacting said interleaved rigid hinge portions.

2. The pin structure set forth in claim 1 wherein said cross section is substantially polygonal.

3. The pin structure set forth in claim 2 wherein said polygonal cross section takes the form of a square.

4. The structure set forth in claim 1 wherein said pin is provided with a pointed end having a diameter at the point of connection with the pin no greater than the diameter of said apertures.